(12) United States Patent
Nicklous et al.

(10) Patent No.: US 10,598,183 B2
(45) Date of Patent: Mar. 24, 2020

(54) AEROMECHANICAL IDENTIFICATION SYSTEMS AND METHODS

(71) Applicant: United Technologies Corporation, Farmington, CT (US)

(72) Inventors: Allison Clark Nicklous, Old Saybrook, CT (US); Steven Tyler Englerth, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 454 days.

(21) Appl. No.: 15/363,472

(22) Filed: Nov. 29, 2016

(65) Prior Publication Data

US 2018/0149162 A1    May 31, 2018

(51) Int. Cl.
*F04D 27/00* (2006.01)
*F01D 25/04* (2006.01)
(Continued)

(52) U.S. Cl.
CPC ........... *F04D 27/001* (2013.01); *F01D 17/02* (2013.01); *F01D 25/04* (2013.01); *F01D 25/164* (2013.01); *F02C 7/045* (2013.01); *F02C 9/24* (2013.01); *F02K 3/06* (2013.01); *F04D 29/329* (2013.01); *F04D 29/38* (2013.01); *F04D 29/522* (2013.01); *G01H 1/006* (2013.01); *G01L 19/0609* (2013.01); *G01M 15/12* (2013.01); *F05D 2260/12* (2013.01); *F05D 2260/16* (2013.01); *F05D 2260/80* (2013.01); *F05D 2260/83* (2013.01); *F05D 2260/96* (2013.01); *F05D 2270/334* (2013.01); *F05D 2270/804* (2013.01)

(58) Field of Classification Search
CPC ........ F02C 7/045; F02C 9/24; G01L 19/0609; F05D 2260/83; F05D 2260/80; F05D 2260/12; F04D 27/001; F04D 29/522; F04D 29/38; F04D 29/329; F01D 25/04
See application file for complete search history.

(56) References Cited

U.S. PATENT DOCUMENTS 2,879,797 A    3/1959    Guaraldi
4,073,600 A    2/1978    Doman
(Continued)

FOREIGN PATENT DOCUMENTS

EP    2056089       5/2009
FR    2956206 A1 *  8/2011    ............. G01H 1/006

OTHER PUBLICATIONS

European Patent Office, European Search Report dated Aug. 6, 2018 in Application No. 17196849.8-1002.

*Primary Examiner* — Brian P Wolcott
(74) *Attorney, Agent, or Firm* — Snell & Wilmer, L.L.P.

(57) ABSTRACT

An aero damping measurement system is provided. The system includes a shroud defining a tunnel, a hub disposed within the tunnel, and a plurality of blades coupled to the hub. The blades may rotate about the hub. A gas pressure probe may have a tip extending to the tunnel to deliver a pressurized burst into the tunnel. An aeromechanical identification system may include a pressurized gas source, a valve in fluid communication with the pressurized gas source, and the gas pressure probe may be in fluid communication with the valve. The valve may control a flow of a pressurized gas from the pressurized gas source into the gas pressure probe. A pressure sensor may be coupled to the gas pressure probe and configured to measure a pressure within the gas pressure probe.

5 Claims, 7 Drawing Sheets

(51) Int. Cl.
*G01M 15/12* (2006.01)
*F02C 9/24* (2006.01)
*F01D 25/16* (2006.01)
*F01D 17/02* (2006.01)
*G01H 1/00* (2006.01)
*F02C 7/045* (2006.01)
*F02K 3/06* (2006.01)
*F04D 29/32* (2006.01)
*F04D 29/38* (2006.01)
*F04D 29/52* (2006.01)
*G01L 19/06* (2006.01)

(56) References Cited

U.S. PATENT DOCUMENTS

| | | | |
|---|---|---|---|
| 4,475,385 A | 10/1984 | Farmer | |
| 4,776,216 A * | 10/1988 | Barton | G01H 1/006 |
| | | | 73/660 |
| 5,206,816 A | 4/1993 | Hill et al. | |
| 6,339,878 B1 | 1/2002 | Owen et al. | |
| 6,582,183 B2 | 6/2003 | Eveker et al. | |
| 6,584,849 B2 | 7/2003 | Loftus et al. | |
| 7,111,982 B1 * | 9/2006 | Swonger, Jr. | G01K 13/02 |
| | | | 374/143 |
| 7,383,136 B1 | 6/2008 | Griffin et al. | |
| 7,509,862 B2 | 3/2009 | Cohen et al. | |
| 7,654,145 B2 * | 2/2010 | Twerdochlib | G01H 1/003 |
| | | | 73/593 |
| 7,681,440 B2 * | 3/2010 | Thomassin | G01M 15/12 |
| | | | 73/112.05 |
| 7,987,725 B2 * | 8/2011 | Twerdochlib | G01H 1/08 |
| | | | 73/584 |
| 8,646,251 B2 | 2/2014 | Rosenkrans et al. | |
| 10,125,880 B2 * | 11/2018 | Hielkema | F16K 15/185 |
| 2002/0059831 A1 * | 5/2002 | Naudet | G01N 29/045 |
| | | | 73/579 |
| 2010/0074727 A1 | 3/2010 | Twerdochlib | |
| 2016/0123238 A1 | 5/2016 | Kay et al. | |
| 2018/0224353 A1 * | 8/2018 | Gysling | G01M 15/14 |

\* cited by examiner

AEROMECHANICAL IDENTIFICATION SYSTEMS AND METHODS

FIELD

The disclosure relates generally to systems and methods for inducing vibration, measuring deflection, and calculating damping of aeromechanical systems.

BACKGROUND

Fans are complex rotating systems that may have undesirable characteristics caused by conditions encountered during normal operation. Fan flutter, for example, is a risk that fan designers and gas turbine engine designers consider. Fan flutter is an aeroelastic instability manifested as a vibrational response that is dependent on operating conditions such as frequency of rotation, fan blade characteristics, and flow path characteristics. Measuring fan flutter during design phases, for example, can be difficult. To study fan flutter, fan flutter should be generated in observable conditions. Fan flutter is elusive as it can be difficult to induce and measure. Thus, aero damping in systems experiencing fan flutter is difficult to design and measure.

SUMMARY

An aero damping measurement system is provided. The system includes a shroud defining a tunnel, a hub disposed within the tunnel, and a plurality of blades coupled to the hub. The blades may rotate about the hub. A gas pressure probe may have a tip extending to the tunnel to deliver a pressurized burst into the tunnel.

In various embodiments, the gas pressure probe may include a valve configured to control a pressure within the gas pressure probe. A transducer may be coupled to the gas pressure probe to measure the pressure within the gas pressure probe. The valve may be operable at a frequency between 0.5 Hz and 260 Hz. The gas pressure probe may include an outlet oriented towards the plurality of blades. The shroud may define a cylindrical opening extending through the shroud in a radial direction. The gas pressure probe may extend through the cylindrical opening. The tip of the gas pressure probe may protrude from the cylindrical opening proximate to the plurality of blades. A sensor probe may detect a deflection of the blades.

An aeromechanical identification system is also provided. The system may include a pressurized gas source, a valve in fluid communication with the pressurized gas source, and a gas pressure probe in fluid communication with the valve. The valve may control a flow of a pressurized gas from the pressurized gas source into the gas pressure probe. A pressure sensor may be coupled to the gas pressure probe and configured to measure a pressure within the gas pressure probe. A controller may be in electronic communication with the valve to command the valve to operate at a frequency. The controller may also be in electronic communication with the pressure sensor.

In various embodiments, a pressure regulator may be controlled by the controller and fluidly coupled between the valve and the pressurized gas source. The aeromechanical identification system may be integrated into an aero damping measurement system. The aero damping measurement system may include a shroud defining a tunnel, a hub disposed within the tunnel, and a plurality of blades coupled to the hub. The blades may rotate about the hub. The gas pressure probe may extend to the tunnel to deliver a pressurized burst into the tunnel. The frequency of the valve may be between 0.5 Hz and 260 Hz.

A method of testing fan flutter is also provided. The method may include the steps of delivering a first burst of a pressurized gas from a first probe towards a rotating blade, delivering a second burst of the pressurized gas from a second probe towards the rotating blade, and measuring a vibration of the rotating blade in response to the first burst and the second burst.

In various embodiments, measuring the vibration of the rotating blade may include monitoring a deflection of the rotating blade with a sensor probe. The first probe and the second probe may be retained in a shroud disposed about the rotating blade. A valve frequency of a valve coupled to the first probe may be determined based on configurable parameters including a minimum frequency ratio, maximum frequency ratio, a step, a time between steps, a dwell time, a nodal diameter, engine angular velocity, and/or blade resonant frequency. A frequency of a valve coupled to the first probe may thus be determined at least in part based on an angular velocity of the rotating blade. A gas pressure may be measured in the first probe with a pressure sensor. The first burst may be controlled using an electronic valve.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
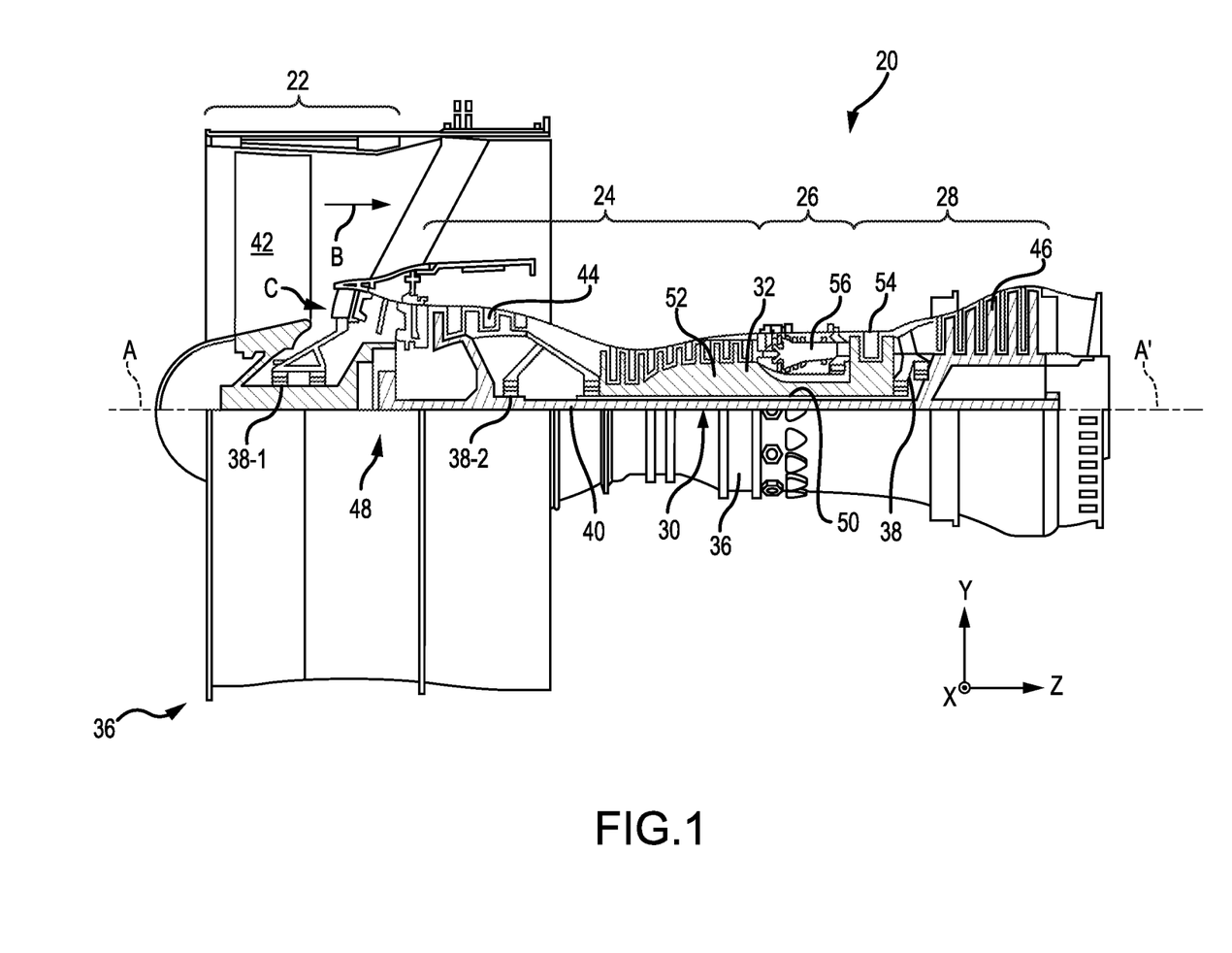
FIG. 1 illustrates an example of a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Fan 42 (or other rotating sections having airfoils such as compressor section 24 or turbine section 28) may experience vibrations commonly known as fan flutter. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2:
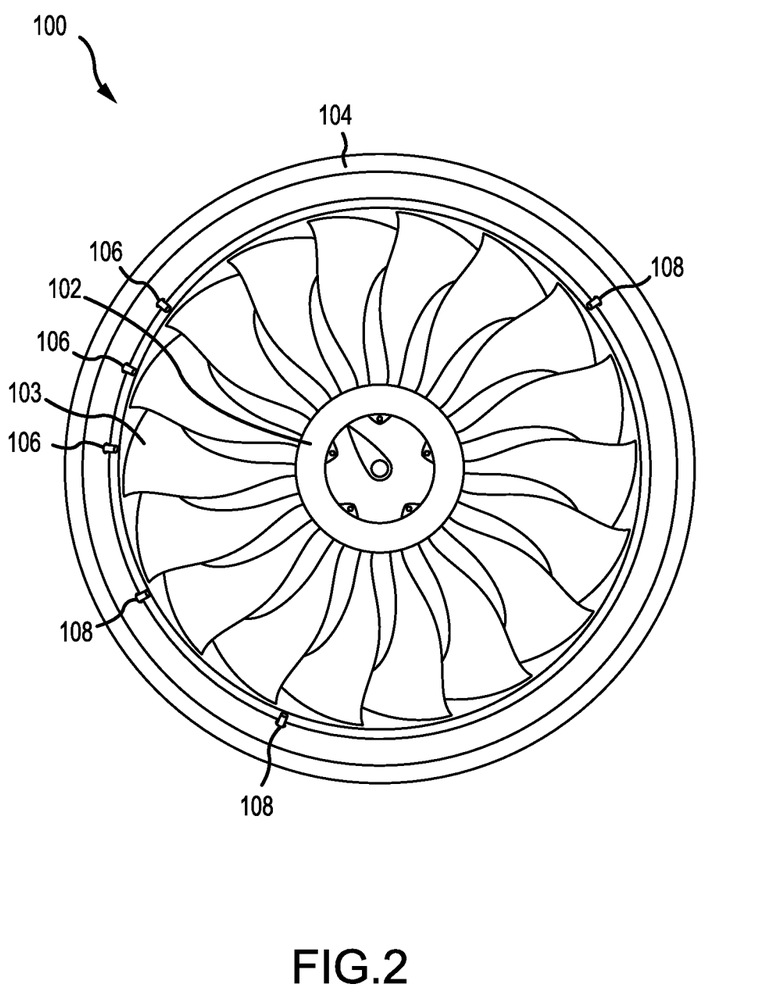
FIG. 2 illustrates a fan having sensors and pressure jets disposed a surface of a shroud in proximity to the fan blades, in accordance with various embodiments.

Referring now to FIG. 2, an aero damping measurement system 100 is shown, in accordance with various embodiments. Aero damping measurement system 100 may include a hub 102 configured to rotate about an axis with a plurality of blades 103 fixedly coupled to hub 102. Blades 103 may rotate about hub 102 within shroud 104. Shroud 104 may have an annular geometry and define a cylindrical tunnel through which air passes, referred to herein as a gas path. Blades 103 may draw air into and drive air through the tunnel defined by shroud 104.

In various embodiments, shroud 104 may define cylindrical openings extending through the shroud in a radial direction, through which sensor probes 106 and gas pressure probes 108 pass. Sensor probes 106 may detect the position of blades 103 as the blades rotate and/or vibrate. Gas pressure probes 108 may deliver pressurized bursts of gas into the gas path in close proximity to blades 103 and upstream from the blades to induce vibrations and/or deflection. Although three sensor probes 106 are illustrated in proximity, sensor probes may be located about shroud 104 in any desired locations and numbers. Similarly, although three gas pressure probes 108 are depicted in FIG. 2, gas pressure probes may be located about shroud 104 in any desired locations and numbers. Gas pressure probes located closer to the outer tips of blades 103 may tend to induce fan blade deflection by delivering pressurized bursts of gas.

Figure 3:
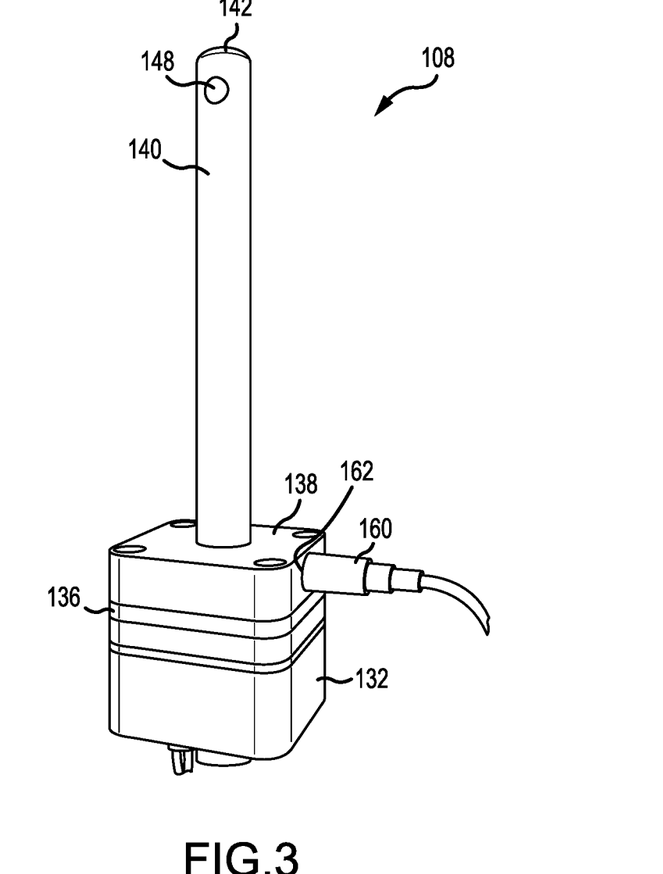
FIG. 3 illustrates a perspective view of a probe for delivering a pressure jet in proximity to a fan, in accordance with various embodiments.

Referring now to FIG. 3, a gas pressure probe 108 is shown, in accordance with various embodiments. Gas pressure probe 108 may include a valve 132 in fluid communication with probe 140. Valve 132 may be mechanically coupled to probe 140 by interface 136. Interface 136 may comprise seals and fasteners to fix the base 138 of gas pressure probe 108 to valve 132. Probe may define outlet 148 in tip 142 of probe 140 where pressurized gas is expelled from probe 140 in response to valve 132 opening. Tip 142 may protrude from shroud 104 (of FIG. 2) in response to gas pressure probe 108 being installed in the shroud. Base 138 of gas pressure probe 108 may include a sensor interface 162 to receive a pressure sensor 160. Pressure sensor 160 may measure the gas pressure present in probe 140 downstream from valve 132. Pressure sensor 160 may be a pressure transducer suitable for use in aerospace fields such as those commercially available through Kulite Semiconductor Products under the tradename Kulite®.

Figure 4:
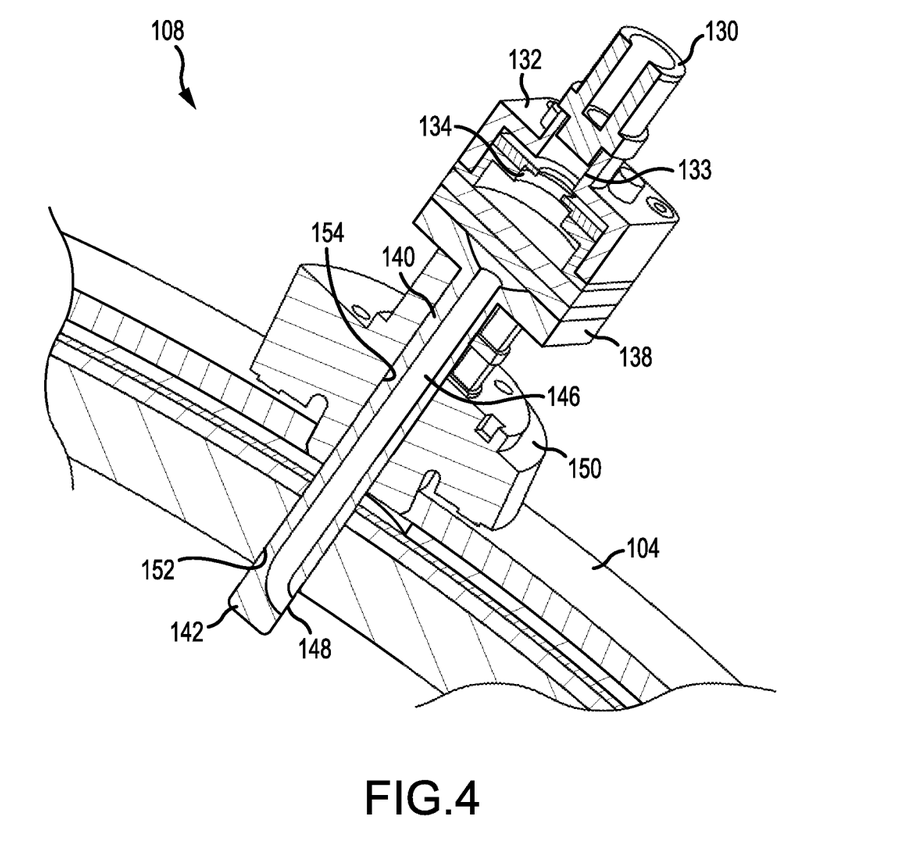
FIG. 4 illustrates a cross sectional view of a probe positioned in a shroud for delivering a pressure jet in proximity to a fan, in accordance with various embodiments.

With reference to FIG. 4, a cross sectional view of gas pressure probe 108 fitted in shroud 104 is shown, in accordance with various embodiments. Tubular conduit 130 is mechanically coupled to valve 132 to deliver pressurized gas to inlet 133 of valve 132. Valve 132 may have electronically controlled switching mechanism 134 capable of opening and closing in response to an electrical signal. Gas may pass into probe 140 in response to valve 132 being in an open state. Valve 132 may prevent gas from passing into probe 140 in response to valve 132 being in a closed state. Valve may be coupled to base 138 of probe 140. Valve 132 may be operable at high frequencies. For example, valve 132 may be capable of opening and closing at frequencies as high as 500 Hz, as high as 400 Hz, as high as 300 Hz, as high as 250 Hz, or other maximum frequencies depending on the configuration of valve 132.

In various embodiments, probe 140 may be inserted into opening 154 defined in mating interface 150. Opening 152 defined in shroud 104 may be aligned with opening 154, and probe 140 may extend through opening 152 so that tip 142 of probe 140 is exposed from shroud 104 and protrudes from shroud 104. Tip 142 may include outlet 148 oriented towards blades 103 (of FIG. 2) to deliver a burst of pressurized gas. Internal passage 146 is defined by gas pressure probe 108 and extends through base 138, through probe 140, and opens as outlet 148.

Figure 5:
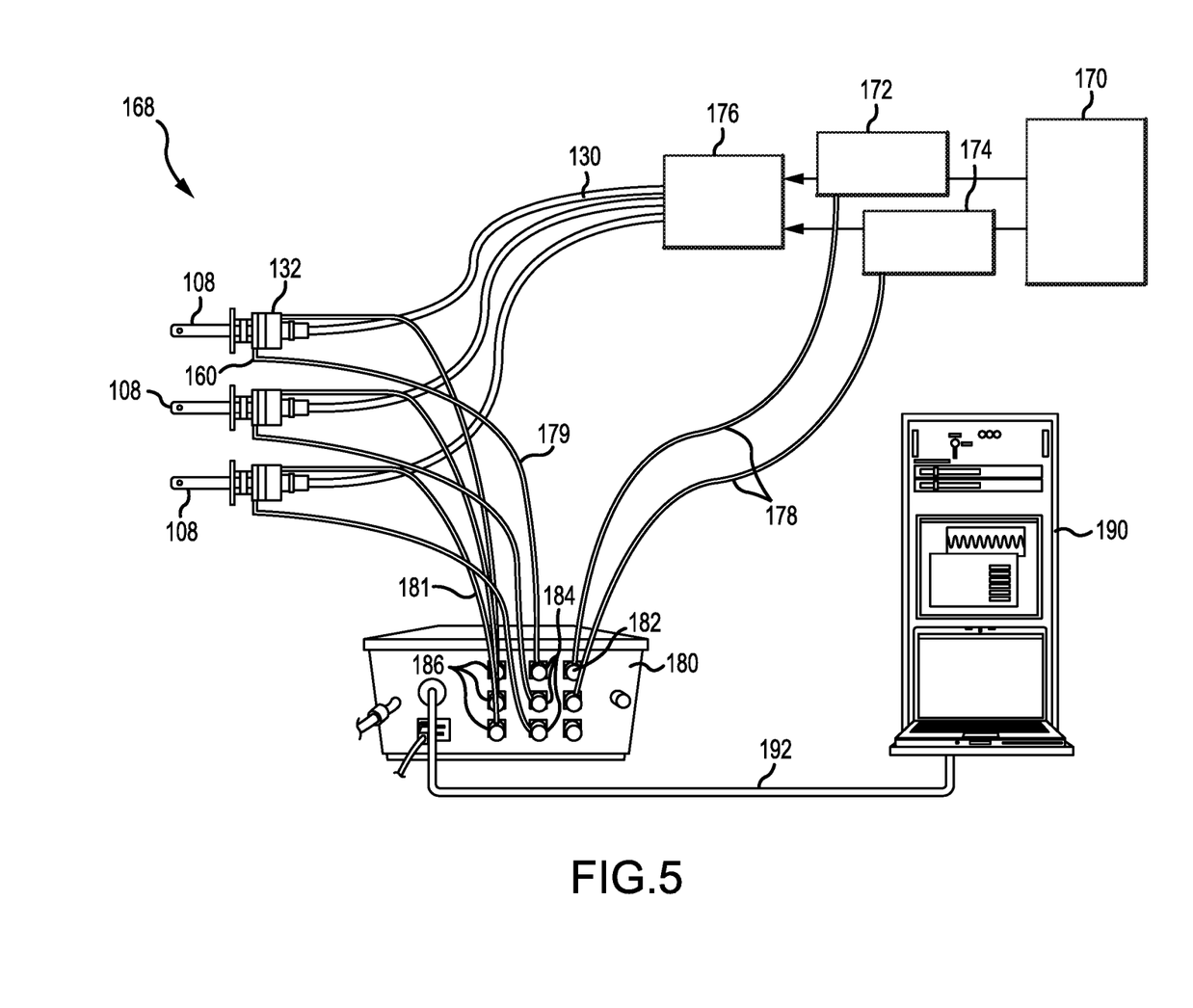
FIG. 5 illustrates a diagram of an electronically controlled pneumatic system for delivering a pressure jet in proximity to a fan and observing resultant vibrations, in accordance with various embodiments.

Referring now to FIG. 5, an aeromechanical identification system 168 is shown to interface with aero damping measurement system 100 (of FIG. 2), in accordance with various embodiments. Aeromechanical identification system 168 may include a pressurized gas source 170 in fluid communication with a pressure regulator 172 and/or a redundant pressure regulator 174 through a tubular conduit. Pressure regulator 172 and redundant pressure regulator may be in electronic communication with controller 180 via wires 178 plugged into pressure regulator channels 182 to receive pressure commands. In response to the pressure commands received from controller 180, the pressure regulators may control gas pressure flowing from pressurized gas source 170, through one or more regulator, and into manifold 176. Manifold 176 may have one or more inlets coupled to pressure regulator 172 and/or redundant pressure regulator 174 via a tubular conduit for fluid communication. Although redundant regulators are illustrated in FIG. 5, a single regulator may also be used with the potential for less uptime in response to a regulator failure. Pressure regulator 172 and/or redundant pressure regulator 174 may control the flow of pressurized gas from pressurized gas source 170 to manifold 176.

In various embodiments, manifold 176 may include one or more outlets coupled to tubular conduit 130. Tubular conduit 130 may transport pressurized gas from manifold 176 to valve 132 and gas pressure probes 108. Each valve 132 may be coupled to a valve control channel 186 on controller 180 to receive control commands via wire 181. Controller 180 may thus command valve 132 to open and close with various frequencies at various time intervals. Pressure sensor 160 may be mechanically coupled to gas pressure probe 108 to measure the gas pressure within each gas pressure probe 108. Pressure sensor 160 may be in electronic communication with controller 180 to report gas pressure measurements to the controller through wires 179 plugged into sensor channels 184 on controller 180.

In various embodiments, controller 180 may be coupled to console 190 for configuration, monitoring, and controls via wires 192. In various embodiments, wires 192 may comprise fiber optic wires, CAT 5 cables, and/or CAT 6 cables to facilitate long distances between a fan where gas pressure probes 108 are installed and console 190 where a user or other automated system interface with aeromechanical identification system 168. Controller 180 may thus be placed in close proximity to gas pressure probes 108. Console 190 may receive input parameters from users, calculate and display other parameters, and/or display test results to users.

Figure 6:
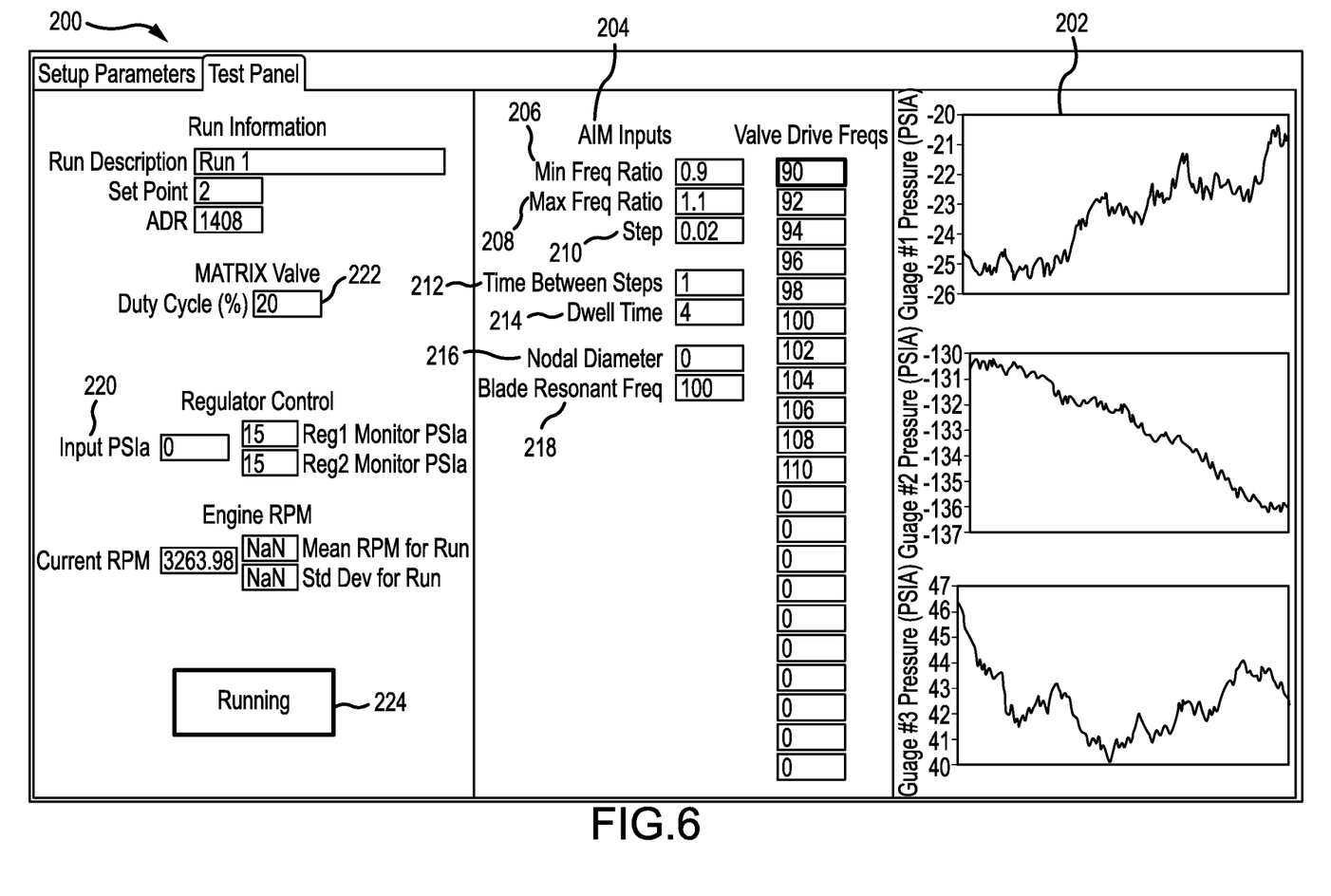
FIG. 6 illustrates a configurable interface for electronically controlling delivery of a pressure jet in proximity to a fan and observing resultant vibrations, in accordance with various embodiments.

With reference to FIG. 6, an interface 200 is shown for controlling the aeromechanical identification system 168 of FIG. 5, in accordance with various embodiments. Interface 200 may include pressure graphs 202 as measured from pressure sensors 160 (in FIG. 5) in each gas pressure probe 108 (in FIG. 5). As illustrated by the pressure graphs 202, provided as an example, each gas pressure probe 108 may have a different pressure than other gas pressure probes 108 at a given time. The pressure in each gas pressure probe 108 may be controlled by a valve 132 (of FIG. 5).

In various embodiments, interface 200 may include configurable parameters 204 that users may manually edit as desired to control the behavior of gas pressure probes 108 including a burst firing order and/or frequency of the probes. Configurable parameters may include minimum frequency ratio 206, maximum frequency ratio 208, step 210, time between steps 212, dwell time 214, nodal diameter 216, and/or blade resonant frequency 218. The minimum frequency ratio, maximum frequency ratio and step may be used to calculate the range of frequencies in the rotating frame around the expected blade resonant frequency of 100 Hz. Frequencies ranging from 90 Hz to 110 Hz in 2 Hz steps are depicted. The nodal diameter, current RPM and range of frequencies in the rotating frame may be used to calculate a range of frequencies in the stationary frame using the following equation: frequency in stationary frame=|frequency in rotating frame+(nodal diameter×current revolutions per minute/60)|. The range of frequencies, in the stationary frame, becomes the valve drive frequencies. The dwell time is how long the valve will actuate at each valve drive frequency and the time between steps is the wait time between each valve drive frequency where the valve is in a closed state. In the case of parameters as depicted in FIG. 6, the valve may actuate at 90 Hz for 4 seconds, then turn off for 1 second, then actuate at 92 Hz for 4 seconds, and turn off for 1 second, etc. Interface 200 may also include run information such as run description, set point, and ADR which may be editable by users. Interface 200 may also display an angular velocity of the engine in revolutions per minute (RPM), which may impact the drive frequencies of valves 132 set by aeromechanical identification system 168. Editable run information may include duty cycle 222, and/or input pressure 220. Duty cycle may be a percentage of how long the valve is opened vs. closed. A 20% duty cycle means the valve is open for 20% of the period and closed for 80% of the period, for example. The input pressure may control the amount of air going to each valve. The pressure range from 50 psi (345 kPa) to 120 psi (827 kPa), for example. Interface 200 may also include a stop/start button 224 that may also display system status (e.g., running or stopped).

The aeromechanical identification system 168 described above may induce vibratory responses in a fan. The vibratory responses may be induced by introducing a moving pressure wave from gas pressure probes 108 (of FIG. 5) in front of a fan. In order to achieve the desired aero damping response, the actuation of the valves (132 in FIG. 5) may be staggered by a predetermined amount. The stagger time between valves may constantly change with engine RPM and input parameters such as nodal diameter and blade resonant frequency. The console running the control software may actuate the valves at frequencies ranging from 0.5 Hz to 260 Hz, from 1 Hz to 400 Hz, from 0 Hz to 500 Hz, or any suitable operating frequency at which valve 132 is capable of switching open and closed.

In various embodiments, the console running the control software may also stagger the start of each valve to 1 millisecond resolution, 1 micro second, or other resolutions based on the controllers of the pressure probes. The aeromechanical identification system 168 of the present disclosure enables one to assess the stability and margin of aeromechanical flutter modes without having the fan actually encounter flutter during flight of an aircraft. Eliminating the need to encounter flutter during flight may tend to reduce engine test time, the need for special test equipment, and testing risk. Data provided by the aeromechanical identification system may also be used to estimate margin on flutter boundaries not encountered during engine or flight test, design a more effective empirical flutter design system, and validate design systems.

Figure 7:
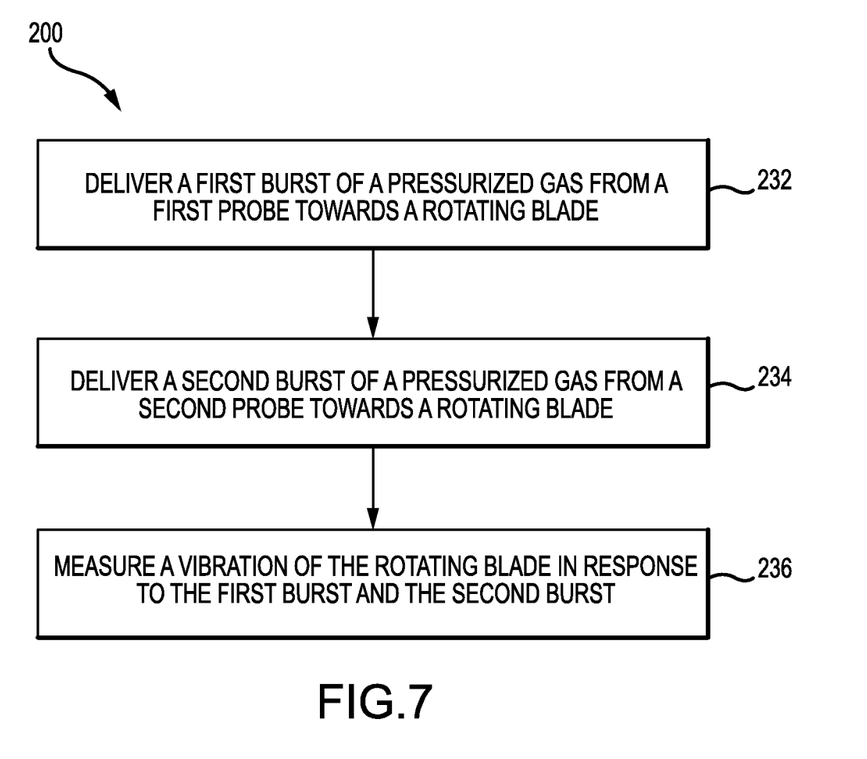
FIG. 7 illustrates a method of testing fan flutter, in accordance with various embodiments.

With reference to FIG. 7, a method 230 for testing fan flutter is shown, in accordance with various embodiments. A system may deliver a first burst of a pressurized gas from a first probe 108 towards a rotating blade 103 (Step 232). The system may deliver a second burst of the pressurized gas from a second probe towards the rotating blade (Step 234). The system may also measure a vibration of the rotating blade in response to the first burst and the second burst (Step 236). The system may measure the vibration of the rotating blade and monitor deflection of the rotating blade with a sensor probe 106.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aeromechanical identification system, comprising:
a pressurized gas source;
a valve in fluid communication with the pressurized gas source;
a first pressure regulator fluidly coupled between the valve and the pressurized gas source configured to receive a pressure command;
a manifold fluidly coupled between the first pressure regulator and the valve;
a gas pressure probe in fluid communication with the valve, wherein the valve is configured to control a flow of a pressurized gas from the pressurized gas source into the gas pressure probe,
wherein the gas pressure probe comprises a probe body having a base configured to receive a pressure sensor, and wherein an electronically controlled switching mechanism of the valve is coupled proximate the base;
the pressure sensor coupled to the gas pressure probe at the base and configured to measure a pressure within the gas pressure probe;
a controller in electronic communication with the valve to command the valve to operate at a frequency, wherein the controller is in electronic communication with the pressure sensor, wherein the controller is in electronic communication with the first pressure regulator and configured to control a gas pressure of the pressurized gas source via the pressure command.

2. The aeromechanical identification system of claim 1, further comprising a second pressure regulator controlled by the controller and fluidly coupled between the valve and the pressurized gas source, wherein the second pressure regulator is configured to be redundant to the first pressure regulator.

3. The aeromechanical identification system of claim 1, wherein the aeromechanical identification system is integrated into an aero damping measurement system.

4. The aeromechanical identification system of claim 3, wherein the aero damping measurement system further comprises:
a shroud defining a passage;
a hub disposed within the passage;
a plurality of blades coupled to the hub and configured to rotate about the hub, wherein the gas pressure probe extends to the passage to deliver a pressurized burst of air into the passage.

5. The aeromechanical identification system of claim 1, wherein the frequency is between 0.5 Hz and 260 Hz.

* * * * *